(12) United States Patent
Kavaturi et al.

(10) Patent No.: US 10,380,128 B2
(45) Date of Patent: Aug. 13, 2019

(54) SYSTEMS AND METHODS FOR DYNAMIC COMPARISON TABLES

(71) Applicant: Wal-Mart Stores, Inc., Bentonville, AR (US)

(72) Inventors: Gokul Kavaturi, San Jose, CA (US); Rohini Satheesh Bharadwaj, Santa Clara, CA (US); Phanindra Vuppalapati, Sunnyvale, CA (US); Chandni Jain, Santa Clara, CA (US); Zuzar Fakhruddin Nafar, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 289 days.

(21) Appl. No.: 15/471,444

(22) Filed: Mar. 28, 2017

(65) Prior Publication Data
US 2018/0285360 A1     Oct. 4, 2018

(51) Int. Cl.
  *G06F 16/23*    (2019.01)
  *G06F 16/2457*  (2019.01)
  *G06F 16/248*   (2019.01)

(52) U.S. Cl.
  CPC .... *G06F 16/24578* (2019.01); *G06F 16/2379* (2019.01); *G06F 16/248* (2019.01)

(58) Field of Classification Search
  CPC .......... G06F 16/24578; G06F 16/2379; G06F 16/248
  See application file for complete search history.

(56) References Cited

U.S. PATENT DOCUMENTS

| | | | |
|---|---|---|---|
| 6,317,739 B1 | 11/2001 | Hirata et al. | |
| 7,752,077 B2 * | 7/2010 | Holden | G06Q 30/06 705/26.1 |
| 2003/0105682 A1 * | 6/2003 | Dicker | G06Q 30/02 705/26.8 |
| 2006/0167757 A1 | 7/2006 | Holden et al. | |
| 2010/0191582 A1 * | 7/2010 | Dicker | G06Q 30/02 705/14.51 |

* cited by examiner

*Primary Examiner* — Jorge A Casanova
(74) *Attorney, Agent, or Firm* — Bryan Cave Leighton Paisner LLP

(57) ABSTRACT

In some embodiments, a method can comprise preparing a comparison table by for comparing the one or more second items to the first item by: determining an item ranking of one or more second items based at least in part on an attribute ranking for each of one or more second attributes, presenting for display in the comparison table the set of the one or more second items and an associated first item, and presenting for display proximate to the comparison table a second set of the one or more second items, the second set of the one or more second items comprising a second predetermined number of the one or more second items comprising one or more next top rankings based on the item ranking of the one or more second items. Other embodiments of related methods and systems are also provided.

20 Claims, 6 Drawing Sheets

500

505 – Receiving a selection of a first item from a user.

510 – Receiving, from an item recommendation database, one or more second items based at least in part on one or more attributes the one or more second items share with the first item.

515 – Determining that a product catalog comprises the one or more second items.

520 - Preparing a comparison table for comparing the one or more second items to the first item by the one or more second items to the first item.

525 - Receiving one or more first attributes for the first item from a facet database.

530 - Receiving one or more second attributes for each of the one or more second items from the facet database, wherein the facet database comprises an attribute ranking for each of the one or more first attributes for the first item and the one or more second attributes for the one or more second items.

535 - Determining an item ranking of the one or more second items based at least in part on the attribute ranking for each of the one or more second attributes.

540 - Selecting a set of the one or more second items based at least in part on the item ranking of the one or more second items, the set of the one or more second items comprising a predetermined number of the one or more second items comprising one or more top rankings based on the item ranking of the one or more second items.

545 - Presenting for display in the comparison table the set of the one or more second items and the first item.

550 - Presenting for display proximate to the comparison table a second set of the one or more second items, the second set of the one or more second items comprising a second predetermined number of the one or more second items comprising one or more next top rankings based on the item ranking of the one or more second items.

555 - Receiving a selection from the user of a selected item of the second set of the one or more second items.

560 - Updating the comparison table based at least in part on the selection from the user of the selected item of the second set of the one or more second items.

FIG. 5

SYSTEMS AND METHODS FOR DYNAMIC COMPARISON TABLES

TECHNICAL FIELD

This disclosure relates generally to systems for dynamic comparison tables, and related methods.

BACKGROUND

System bandwidth can become slow or bottlenecked when searching and/or browsing a website, such as an eCommerce website, and comparing various item search results. Many times, when a user of the website has difficulty finding an item, the user can conduct numerous user actions and/or item activities (e.g., clicking on one or more items or entering new search terms). These user actions and/or item activities can decrease the efficiency of a system by increasing the amount of item information retrieved from a database. The ability to prepare dynamic comparison tables to efficiently present similar and differentiating features of an item currently being viewed against similar items can decrease the demand on system resources and improve user experience. Accordingly, there is a need for systems and methods to provide for dynamic comparison tables.

BRIEF DESCRIPTION OF THE DRAWINGS

To facilitate further description of the embodiments, the following drawings are provided in which:

FIG. 5 illustrates is a flowchart for a method, according to an embodiment; and

Figure 1:
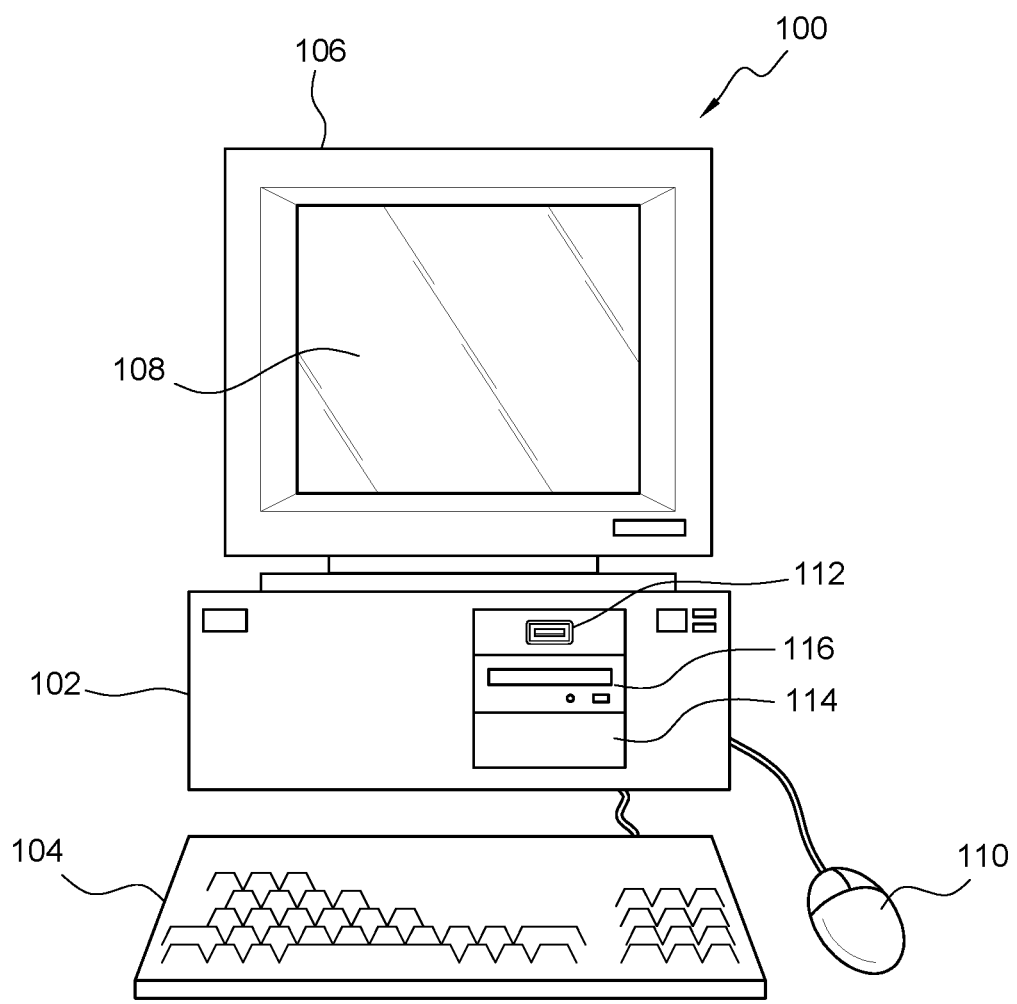
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. In many embodiments, the system can comprise one or more processing modules and one or more non-transitory storage modules storing computing instructions configured to run on the one or more processing modules and perform acts. In many embodiments, the acts can comprise receiving a selection of a first item from a user, receiving, from an item recommendation database, one or more second items based at least in part on one or more attributes the one or more second items share with the first item, and determining that a product catalog comprises the one or more second items. In many embodiments, the acts further can comprise preparing a comparison table by for comparing the one or more second items to the first item by: (1) receiving one or more first attributes for the first item from a facet database; (2) receiving one or more second attributes for each of the one or more second items from the facet database, wherein the facet database comprises an attribute ranking for each of the one or more first attributes for the first item and the one or more second attributes for the one or more second items; (3) determining an item ranking of the one or more second items based at least in part on the attribute ranking for each of the one or more second attributes; (4) selecting a set of the one or more second items based at least in part on the item ranking of the one or more second items, the set of the one or more second items comprising a predetermined number of the one or more second items comprising one or more top rankings based on the item ranking of the one or more second items; (5) presenting for display in the comparison table the set of the one or more second items and the first item; and (6) presenting for display proximate to the comparison table a second set of the one or more second items, the second set of the one or more second items comprising a second predetermined number of the one or more second items comprising one or more next top rankings based on the item ranking of the one or more second items. In many embodiments, the acts further can comprise receiving a selection from the user of a selected item of the second set of the one or more second items and updating the comparison table based at least in part on the selection from the user of the selected item of the second set of the one or more second items.

Many embodiments can comprise a method. In some embodiments, the method can comprise receiving a selection of a first item from a user, receiving, from an item recommendation database, one or more second items based at least in part on one or more attributes the one or more second items share with the first item, and determining that a product catalog comprises the one or more second items. In many embodiments, the method further can comprise preparing a comparison table by for comparing the one or more second items to the first item by: (1) receiving one or more first attributes for the first item from a facet database; (2) receiving one or more second attributes for each of the one or more second items from the facet database, wherein the facet database comprises an attribute ranking for each of the one or more first attributes for the first item and the one or more second attributes for the one or more second items; (3) determining an item ranking of the one or more second items based at least in part on the attribute ranking for each of the one or more second attributes; (4) selecting a set of the one or more second items based at least in part on the item ranking of the one or more second items, the set of the one or more second items comprising a predetermined number of the one or more second items comprising one or more top rankings based on the item ranking of the one or more second items; (5) presenting for display in the comparison table the set of the one or more second items and the first item; and (6) presenting for display proximate to the comparison table a second set of the one or more second items, the second set of the one or more second items comprising a second predetermined number of the one or more second items comprising one or more next top rankings based on the item ranking of the one or more second items. In many embodiments, the method further can comprise receiving a selection from the user of a selected item of the second set of the one or more second items and updating the comparison table based at least in part on the selection from the user of the selected item of the second set of the one or more second items.

A number of embodiments comprise a method. In some embodiments, the method can comprise determining a blacklist comprising one or more attributes based on attribute rankings of a set of attributes of one or more products in a facet database, the set of attributes of the one or more products comprising the one or more attributes, receiving a selection of a first item from a user, and receiving, from an item recommendation service, one or more second items based at least in part on one or more shared attributes of the one or more attributes the one or more second items share with the first item. In many embodiments, the method can further comprise determining that a product catalog comprises the one or more second items and preparing a comparison table for comparing the one or more second items to the first item by the one or more second items to the first item by: (1) receiving one or more first attributes for the first item from the facet database, the set of attributes of the one or more products comprising the one or more first attributes, (2) receiving one or more second attributes for each of the one or more second items from the facet database, the set of attributes of the one or more products comprising the one or more second attributes, (3) determining an item ranking of the one or more second items based at least in part on an attribute ranking of the attribute rankings for each of the one or more second attributes and the blacklist, (4) selecting a set of the one or more second items based at least in part on the item ranking of the one or more second items and the blacklist, wherein the set of the one or more second items comprise a shared attribute of the one or more shared attributes and the blacklist does not comprise the shared attribute of the one or more shared attributes, the set of the one or more second items comprising a predetermined number of the one or more second items comprising one or more top rankings based on the item ranking of the one or more second items, (5) presenting for display in the comparison table, the set of the one or more second items and the first item, and (6) presenting for display, proximate to the comparison table, a second set of the one or more second items, the second set of the one or more second items comprising a second predetermined number of the one or more second items comprising one or more next top rankings based on the item ranking of the one or more second items. In many embodiments, the method further can comprise receiving a selection from the user of a selected item of the second set of the one or more second items and updating the comparison table based at least in part on the selection from the user of the selected item of the second set of the one or more second items.

Figure 2:
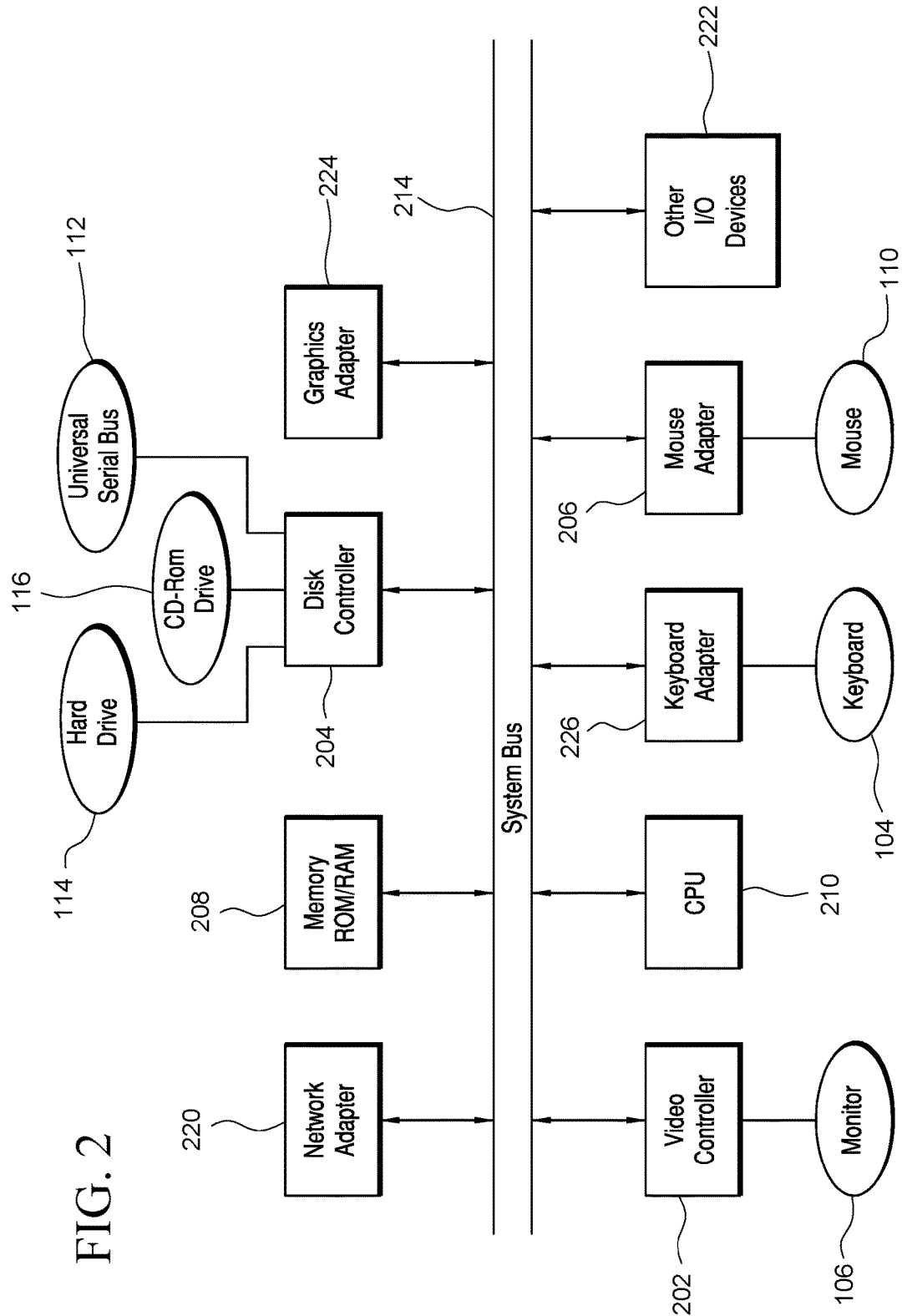
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with a CD-ROM and/or DVD drive 116 (FIGS. 1-2), floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
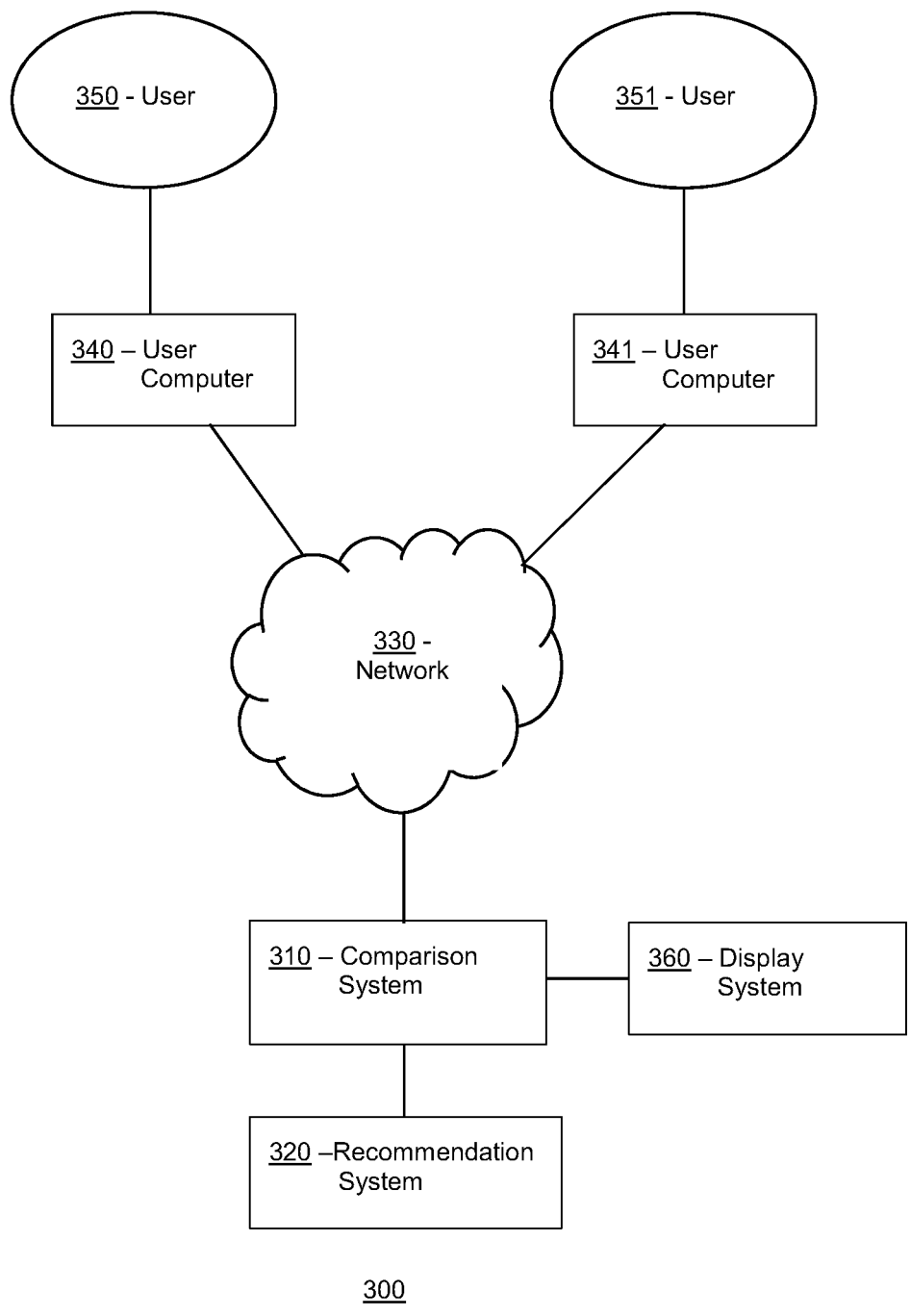
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise a comparison system 310, a recommendation system 320, and a display system 360. In some embodiments, comparison system 310, recommendation system 320, and display system 360 can each be a computer system 100 (FIG. 1), as described above, and can each be a single computer, a single server, or a cluster or collection of computers or servers. In some embodiments, comparison system 310 and/or recommendation system 320 can be in communication with an inventory database (not shown) which can track distinct items (e.g., stock keeping units (SKUs)), and images of the distinct items, in a product catalog, which can be ordered through the online retailer and which can be housed at one or more warehouses. In many embodiments, warehouses can comprise brick-and-mortar stores, distribution centers, and/or other storage facilities.

In many embodiments, comparison system 310, recommendation system 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of comparison system 310, recommendation system 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of comparison system 310, recommendation system 320, and/or display system 360. In a similar manner, the processing module(s) and the memory storage module(s) can be local and/or remote to each other.

In many embodiments, comparison system 310 and/or display system 360 can be configured to communicate with one or more user computers 340 and 341. In some embodiments, user computers 340 and 341 also can be referred to as customer computers. In some embodiments, comparison system 310 and/or display system 360 can communicate or interface (e.g. interact) with one or more customer computers (such as user computers 340 and 341) through a network 330. In some embodiments, network 330 can be an internet, an intranet that is not open to the public, an email system, and/or a texting system. In many embodiments, network 330 can comprise one or more electronic transmission channels. In many embodiments, the electronic transmission channels can comprise an email, a text message, and/or an electronic notice or message. Accordingly, in many embodiments, comparison system 310 and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, comparison system 310, recommendation system 320, and/or display system 360 also can be configured to communicate with one or more databases. The one or more database can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between comparison system 310, recommendation system 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
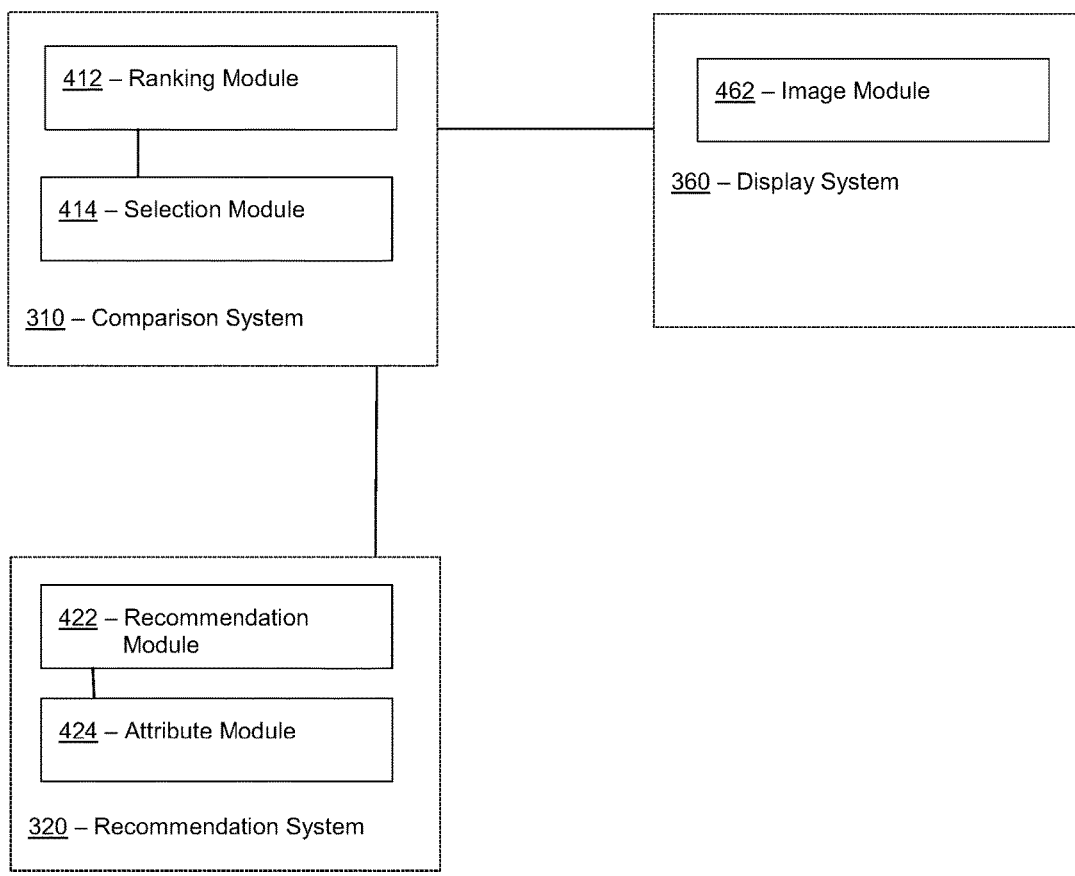
FIG. 4 illustrates a representative block diagram of a portion of the system of FIG. 3, according to an embodiment.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 412, 414, 422, 424, and/or 462 (FIG. 4). Such non-transitory memory storage modules can be part of a computer system such as comparison system 310 (FIGS. 3 & 4), recommendation system 320 (FIGS. 3 & 4), and/or display system 360 (FIGS. 3 & 4). The processing module(s) can be similar or identical to the processing module(s) described above with respect to computer system 100 (FIG. 1).

In many embodiments, method 500 can be a method of preparing a comparison table for comparing attributes of one or more items. For example, method 500 can comprise an activity 505 of receiving a selection of a first item (e.g., a SAMSUNG 70 inch high definition television) from a user (e.g., user 350 (FIG. 3) and/or user 351 (FIG. 3)). In some embodiments, the user can select the first item while searching and/or browsing on a website. In some embodiments, the website can present to the user one or more items from an item recommendation database for selection. In some embodiments, for products or items that are trending on the website (e.g., an item which more people are interested in or a popular item), the comparison table can be generated only once. In many embodiments, subsequent requests for the comparison table for the trending item can be served from a cache, thereby reducing load on the application. In many embodiments, the cache can have a hit ratio of approximately 80% and can be refreshed periodically.

In many embodiments, method 500 further can comprise an activity 510 of receiving, from the item recommendation database, one or more second items based at least in part on one or more attributes the one or more second items share with the first item (e.g., similarly sized high definition televisions manufactured by brands other than SAMSUNG and/or other SAMSUNG televisions of various sizes and/or styles). In some embodiments, the item recommendation database can comprise a third party database, a third party recommendation service, an internal recommendation service, a product or item catalog, or a recommendation from a third user. In some embodiments, the one or more attributes can comprise one or more first attributes of the first item and one or more second attributes of the one or more second items. In many embodiments, the one or more attributes can comprise a product or item type, a product or item description, a product or item color, a product or item size, a product or item weight, and/or any other information associated with a product or item. In some embodiments, the one or more attributes are stored in a facet database or taxonomy. In some embodiments, when the one or more second items are fetched and/or received, a comparison table for the one or more second items can be generated using the current data obtained for this item. In many embodiments, the comparison table generated for one or more of the one or more second items can be stored in a cache for later retrieval. In some embodiments, the cached can be updated periodically.

In some embodiments, method 500 further can comprise an activity 515 of determining that a product or item catalog comprises the one or more second items. An advantage of activity 515 of determining that the product or item catalog comprises the one or more second items is that this activity allows only items that are in available through the merchant to potentially be compared in the comparison table, which can increase the efficiency of preparing the comparison table in activity 520 described below.

In some embodiments, method 500 can further comprise an activity 520 of preparing a comparison table for comparing the one or more second items to the first item. In some embodiments, activity 520 of preparing a comparison table for comparing the one or more second items to the first item can comprise activity 525 of receiving one or more first attributes for the first item from the facet database and activity 530 of receiving one or more second attributes for each of the one or more second items from the facet database, wherein the facet database comprises an attribute ranking for each of the one or more first attributes for the first item and the one or more second attributes for the one or more second items. In some embodiments, the attribute ranking can be based at least in part on at least one of: an attribute click rate (e.g., a rate at which a user clicks on an attribute) or a search query extraction.

In some embodiments, activity 520 further can comprise activity 535 of determining an item ranking of the one or more second items based at least in part on the attribute ranking for each of the one or more second attributes and activity 540 of selecting a set of the one or more second items based at least in part on the item ranking of the one or more second items, the set of the one or more second items comprising a predetermined number of the one or more second items comprising one or more top rankings based on the item ranking of the one or more second items. In some embodiments, the item ranking can be based on at least one of: a click rate (e.g., a rate at which the user clicks on one or more items on the webpage), a bounce rate (e.g., a rate at which the user leaves a webpage to go to a different webpage, or a rate at which the user leaves one or more items such as clicking a first item and then leaving the first item by clicking a second item), an add to cart rate (e.g., a rate at which the user adds an item to cart after viewing the item), or a purchase rate (e.g., a rate at which the user purchases the item after viewing it and/or after adding the item to the cart). In some embodiments, the predetermined number of the one or more second items can comprise 2-100. In some embodiments, the predetermined number can be at least 2. In some embodiments, the comparison table can comprise a carousel to display the set of the one or more second items. In some embodiments, the predetermined number can be based at least in part on the computer of the user. In some embodiments, the predetermined number for when a user selects the first item on a mobile device of the user can be less than the predetermined number for when a user selects the first item on a non-mobile device of the user.

In some embodiments, activity 520 further can comprise activity 545 of presenting for display in the comparison table the set of the one or more second items and the first item and activity 550 of presenting for display proximate to the comparison table a second set of the one or more second items, the second set of the one or more second items comprising a second predetermined number of the one or more second items comprising one or more next top rankings based on the item ranking of the one or more second items. In some embodiments, the second set of the one or more second items can be located in a carousel to the right of the comparison table. In some embodiments, the second set of the one or more second items are located in a carousel to the above, beneath, and/or to the left of the comparison table.

In some embodiments, method 500 further can comprise an activity 555 of receiving a selection from the user of a selected item (e.g., a VIZIO 60 inch high definition television with no known refresh rate) of the second set of the one or more second items. In some embodiments, activity 555 of receiving the selection from the user of the selected item of the second set of the one or more second items comprises the user selecting the selected item of the second set of the one or more second items and moving (e.g., dragging and dropping) the selected item of the second set of the one or more second items into the comparison table. In some embodiments, activity 555 of receiving the selection from the user of the selected item of the second set of the one or more second items comprises the user selecting the selected item of the second set of the one or more second items by clicking and/or hovering over the selected item of the second set of the one or more second items.

In many embodiments, method 500 further can comprise an activity 560 of updating the comparison table based at least in part on the selection from the user of the selected item of the second set of the one or more second items. In some embodiments, activity 560 can comprise changing the content of the comparison table to accommodate one or more new and/or different attributes of a newly introduced product selected by the user from the second set of items and/or dropping and/or removing any attribute from the comparison table that is not applicable to the newly added item. In some embodiments, activity 560 of updating the comparison table based at least in part on the selection from the user of the selected item of the second set of the one or more second items can comprise determining an updated item ranking of the one or more second items based at least in part one or more attributes of the selected item of the second set of the one or more second items into the comparison table. In some embodiments, activity 560 of updating the comparison table based at least in part on the selection from the user of the selected item of the second set of the one or more second items can comprise removing from the comparison table an attribute of the one or more second attributes of an updated set of one or more second items if the selected item of the second set of the one or more second items does not comprise the attribute of the one or more second attributes of an updated set of one or more second items of the one or more second items (e.g., removing the refresh rate attribute when the VIZIO 60 inch high definition television does not share the attribute category of refresh rate with the SAMSUNG 70 inch high definition television).

In some embodiments, method 500 further can comprise determining a blacklist comprising one or more blacklisted attributes (e.g., one or more unapproved attributes) based on the attribute rankings of a set of attributes of one or more products in the facet database, the set of attributes of the one or more products comprising the one or more attributes. In some embodiments, an inclusion-exclusion method can be used to determine the whitelist and blacklist for one or more attributes of the one or more products, (e.g. each product type). In many embodiments, attributes which are often mentioned in the search queries and/or facet filtering while browsing can be added to the whitelist. In some embodiments, a whitelist also can comprise a set of attributes with higher quality scores, along with the previously specified attributes—which can be determined by a learning algorithm. In some embodiments, the learning algorithm can learn on a test set of attributes to values and can determine whether the value for any given attribute is good and thereby assign the attribute a higher weight and/or score. In some embodiments, an attribute can also be included in a whitelist if its coverage for a particular product type is more than a configurable threshold (e.g., the number of times an attribute occurs for all products in a given product type). In some embodiments, a blacklist can include irrelevant attributes from the exclusion list which can be hand curated for each product type by taxonomists. In some embodiments, method 500 further can comprise determining a whitelist comprising one or more approved attributes based on the attribute rankings of a set of attributes of the one or more attributes.

In some embodiments, the one or more activities of method 500 can be accomplished using a computer algorithm. In some embodiments, the computer algorithm can comprise:

---

```
initialize the product_type array
for each product_type in product_type_array do
    all_items = get all products for product_type
    for each item in all_items do
        similar_items [ ] = get similar items from IRS for current
        item
        for each item in similar_items do
            if item is published on Walmart.com
```

```
            then
                get_compare_attributes(item)
            else
                return
            for each attribute in compare_attributes do
                get attribute value from PCF Catalog
                if attribute is present in current item and at least 50% of items
have
its value
                    then
                        keep attribute for comparison table
                    else
                        remove attribute for comparison table
            build comparison table xml
            push to attribute store and get hash
            update hash in current item's PCF
function get_compare_attributes(item):
        attributes = get generic top ranked attributes (with highest click
        rate and search query extraction) from facet database
        attributes = get specific attributes from taxonomy
        return attributes
```

Figure 6:
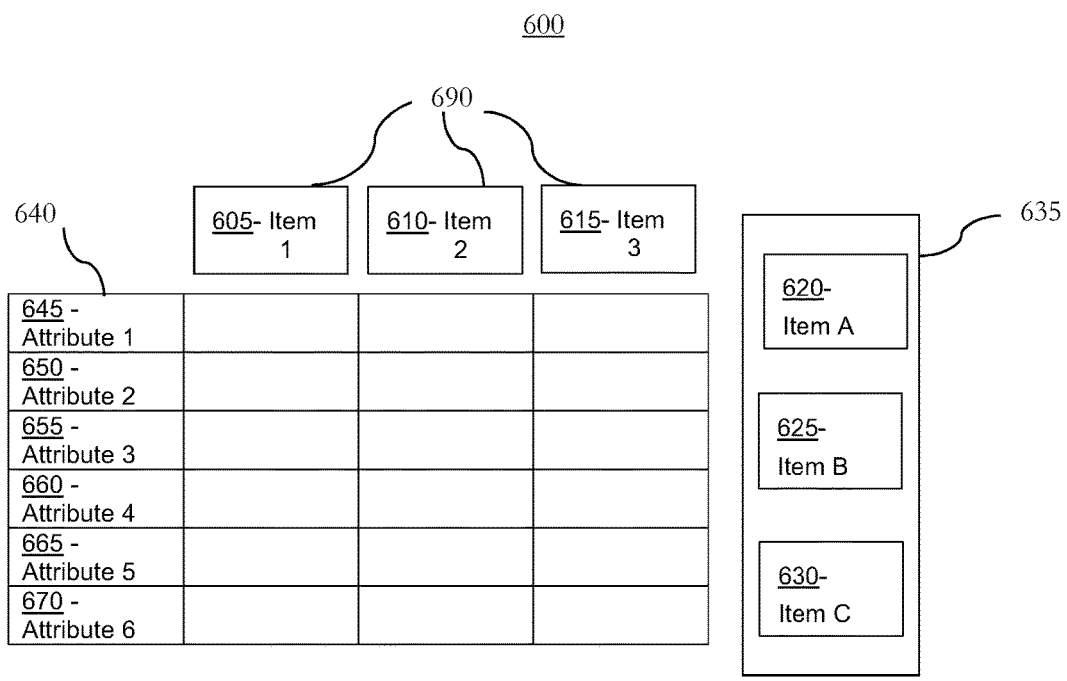
FIG. 6 illustrates a comparison table, according to an embodiment.

Turning briefly to FIG. 6, FIG. 6 illustrates a webpage 600 and/or a comparison table according to many embodiments. In some embodiments, webpage 600 can comprise a first item 605 (e.g., the first item selected by the user), a first set 690 of one or more second items 610 and 615, and a second set 635 of one or more third items 620, 625, and 630. Webpage 600 can further comprise a list of attributes 640 in a first column (e.g., attribute 1 645, attribute 2 650, attribute 3 655, attribute 4 660, attribute 5 665, and attribute 6 670). The columns under first item 605 and one or more second items 610 and 615 can display the values for each attribute in the list of attributes 640.

Returning to FIG. 4, FIG. 4 illustrates a block diagram of a portion of system 300 comprising comparison system 310, recommendation system 320, and/or display system 360, according to the embodiment shown in FIG. 3. Each of comparison system 310, recommendation system 320, and/or display system 360 is merely exemplary and is not limited to the embodiments presented herein. Each of comparison system 310, recommendation system 320, and/or display system 360 can be employed in many different embodiments or examples not specifically depicted or described herein. In some embodiments, certain elements or modules of comparison system 310, recommendation system 320, and/or display system 360 can perform various procedures, processes, and/or acts. In other embodiments, the procedures, processes, and/or acts can be performed by other suitable elements or modules.

In many embodiments, comparison system 310 can comprise non-transitory memory storage modules 412 and 414, recommendation system 320 can comprise non-transitory memory storage modules 422 and 424, and display system 360 can comprise a non-transitory memory storage module 462. Memory storage module 412 can be referred to as a ranking module 412, and memory storage module 414 can be referred to as a selection module 414. Memory storage module 422 can be referred to as a recommendation module 422, and memory storage module 424 can be referred to as an attribute module. Memory storage module 462 can be referred to as an image module 462.

In many embodiments, ranking module 412 can store computing instructions configured to run on one or more processing modules and perform one or more acts of methods 500 (FIG. 5) (e.g., activities 520, 525, 530, 535, and/or 560).

In some embodiments, selection module 414 can store computing instructions configured to run on one or more processing modules and perform one or more acts of methods 500 (FIG. 5) (e.g., activities 505, 540, and/or 555).

In many embodiments, recommendation module 422 can store computing instructions configured to run on one or more processing modules and perform one or more acts of methods 500 (FIG. 5) (e.g., activity 515).

In many embodiments, attribute module 424 can store computing instructions configured to run on one or more processing modules and perform one or more acts of methods 500 (FIG. 5) (e.g., activities 510).

In some embodiments, image module 462 can store computing instructions configured to run on one or more processing modules and perform one or more acts of methods 500 (FIG. 5) (e.g., activities 545 and/or 550).

Although systems and methods for dynamic comparison tables have been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the activities of FIG. 5 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processing modules; and
   one or more non-transitory storage modules storing computing instructions configured to run on the one or more processing modules and perform acts of:
      receiving a selection of a first item from a user;
      receiving, from an item recommendation database, one or more second items based at least in part on one or more attributes the one or more second items share with the first item;
      determining that a product catalog comprises the one or more second items;
      preparing a comparison table for comparing the one or more second items to the first item by the one or more second items to the first item by:
         receiving one or more first attributes for the first item from a facet database;

receiving one or more second attributes for each of the one or more second items from the facet database, wherein the facet database comprises an attribute ranking for each of the one or more first attributes for the first item and the one or more second attributes for the one or more second items;

determining an item ranking of the one or more second items based at least in part on the attribute ranking for each of the one or more second attributes;

selecting a set of the one or more second items based at least in part on the item ranking of the one or more second items, the set of the one or more second items comprising a predetermined number of the one or more second items comprising one or more top rankings based on the item ranking of the one or more second items;

presenting for display in the comparison table the set of the one or more second items and the first item; and presenting for display proximate to the comparison table a second set of the one or more second items, the second set of the one or more second items comprising a second predetermined number of the one or more second items comprising one or more next top rankings based on the item ranking of the one or more second items;

receiving a selection from the user of a selected item of the second set of the one or more second items; and updating the comparison table based at least in part on the selection from the user of the selected item of the second set of the one or more second items.

2. The system of claim 1, wherein:
receiving the selection from the user of the selected item of the second set of the one or more second items comprises the user selecting the selected item of the second set of the one or more second items and moving the selected item of the second set of the one or more second items into the comparison table.

3. The system of claim 1, wherein:
updating the comparison table based at least in part on the selection from the user of the selected item of the second set of the one or more second items comprises:
determining an updated item ranking of the one or more second items based at least in part on the one or more attributes of the selected item of the second set of the one or more second items into the comparison table.

4. The system of claim 1, wherein:
the second set of the one or more second items are located in a carousel to a right of the comparison table.

5. The system of claim 1, wherein:
updating the comparison table based at least in part on the selection from the user of the selected item of the second set of the one or more second items comprises:
removing from the comparison table an attribute of the one or more second attributes of an updated set of one or more second items if the selected item of the second set of the one or more second items does not comprise the attribute of the one or more second attributes of the updated set of one or more second items of the one or more second items.

6. The system of claim 1, wherein:
the one or more non-transitory storage modules storing the computing instructions are configured to run on the one or more processing modules and further perform the acts of:

determining a blacklist comprising one or more blacklisted attributes based on the attribute rankings of a set of attributes of one or more products in the facet database, the set of attributes of the one or more products comprising the one or more attributes.

7. The system of claim 1, wherein:
the one or more non-transitory storage modules storing the computing instructions are configured to run on the one or more processing modules and further perform the acts of:
determining a whitelist comprising one or more approved attributes based on the attribute rankings of a set of attributes of the one or more attributes.

8. The system of claim 1, wherein:
receiving the selection from the user of the selected item of the second set of the one or more second items comprises the user selecting the selected item of the second set of the one or more second items and moving the selected item of the second set of the one or more second items into the comparison table;

updating the comparison table based at least in part on the selection from the user of the selected item of the second set of the one or more second items comprises:
determining an updated item ranking of the one or more second items based at least in part on the one or more attributes of the selected item of the second set of the one or more second items into the comparison table;

the second set of the one or more second items are located in a carousel to a right of the comparison table;

updating the comparison table based at least in part on the selection from the user of the selected item of the second set of the one or more second items comprises:
removing from the comparison table an attribute of the one or more second attributes of an updated set of one or more second items if the selected item of the second set of the one or more second items does not comprise the attribute of the one or more second attributes of the updated set of one or more second items of the one or more second items; and the one or more non-transitory storage modules storing the computing instructions are configured to run on the one or more processing modules and further perform the acts of:
determining a blacklist comprising one or more blacklisted attributes based on the attribute rankings of a set of attributes of one or more products in the facet database, the set of attributes of the one or more products comprising the one or more attributes; and
determining a whitelist comprising one or more approved attributes based on the attribute rankings of the set of attributes of the one or more attributes.

9. A method comprising:
receiving a selection of a first item from a user;
receiving, from an item recommendation database, one or more second items based at least in part on one or more attributes the one or more second items share with the first item;
determining that a product catalog comprises the one or more second items;
preparing a comparison table for comparing the one or more second items to the first item by the one or more second items to the first item by:
receiving one or more first attributes for the first item from a facet database;
receiving one or more second attributes for each of the one or more second items from the facet database, wherein the facet database comprises an attribute ranking for each of the one or more first attributes for the first item and the one or more second attributes for the one or more second items;

determining an item ranking of the one or more second items based at least in part on the attribute ranking for each of the one or more second attributes;

selecting a set of the one or more second items based at least in part on the item ranking of the one or more second items, the set of the one or more second items comprising a predetermined number of the one or more second items comprising one or more top rankings based on the item ranking of the one or more second items;

presenting for display in the comparison table the set of the one or more second items and the first item; and presenting for display proximate to the comparison table a second set of the one or more second items, the second set of the one or more second items comprising a second predetermined number of the one or more second items comprising one or more next top rankings based on the item ranking of the one or more second items;

receiving a selection from the user of a selected item of the second set of the one or more second items; and updating the comparison table based at least in part on the selection from the user of the selected item of the second set of the one or more second items.

10. The method of claim 9, wherein:
receiving the selection from the user of the selected item of the second set of the one or more second items comprises the user selecting the selected item of the second set of the one or more second items and moving the selected item of the second set of the one or more second items into the comparison table.

11. The method of claim 9, wherein:
updating the comparison table based at least in part on the selection from the user of the selected item of the second set of the one or more second items comprises:
determining an updated item ranking of the one or more second items based at least in part on the one or more attributes of the selected item of the second set of the one or more second items into the comparison table.

12. The method of claim 9, wherein:
the second set of the one or more second items are located in a carousel to a right of the comparison table.

13. The method of claim 9, wherein:
updating the comparison table based at least in part on the selection from the user of the selected item of the second set of the one or more second items comprises:
removing from the comparison table an attribute of the one or more second attributes of an updated set of one or more second items if the selected item of the second set of the one or more second items does not comprise the attribute of the one or more second attributes of the updated set of one or more second items of the one or more second items.

14. The method of claim 9, further comprising:
determining a blacklist comprising one or more blacklisted attributes based on the attribute rankings of a set of attributes of one or more products in the facet database, the set of attributes of the one or more products comprising the one or more attributes.

15. The method of claim 9, further comprising:
determining a whitelist comprising one or more approved attributes based on the attribute rankings of a set of attributes of the one or more attributes.

16. The method of claim 9, wherein:
receiving the selection from the user of the selected item of the second set of the one or more second items comprises the user selecting the selected item of the second set of the one or more second items and moving the selected item of the second set of the one or more second items into the comparison table;

updating the comparison table based at least in part on the selection from the user of the selected item of the second set of the one or more second items comprises:
determining an updated item ranking of the one or more second items based at least in part on the one or more attributes of the selected item of the second set of the one or more second items into the comparison table;

the second set of the one or more second items are located in a carousel to a right of the comparison table;

updating the comparison table based at least in part on the selection from the user of the selected item of the second set of the one or more second items comprises:
removing from the comparison table an attribute of the one or more second attributes of an updated set of one or more second items if the selected item of the second set of the one or more second items does not comprise the attribute of the one or more second attributes of the updated set of one or more second items of the one or more second items; and the method further comprises:
determining a blacklist comprising one or more blacklisted attributes based on the attribute rankings of a set of attributes of one or more products in the facet database, the set of attributes of the one or more products comprising the one or more attributes; and determining a whitelist comprising one or more approved attributes based on the attribute rankings of the set of attributes of the one or more attributes.

17. A method comprising:
determining a blacklist comprising one or more attributes based on attribute rankings of a set of attributes of one or more products in a facet database, the set of attributes of the one or more products comprising the one or more attributes;

receiving a selection of a first item from a user;

receiving, from an item recommendation service, one or more second items based at least in part on one or more shared attributes of the one or more attributes the one or more second items share with the first item;

determining that a product catalog comprises the one or more second items;

preparing a comparison table for comparing the one or more second items to the first item by the one or more second items to the first item by:
receiving one or more first attributes for the first item from the facet database, the set of attributes of the one or more products comprising the one or more first attributes;

receiving one or more second attributes for each of the one or more second items from the facet database, the set of attributes of the one or more products comprising the one or more second attributes;

determining an item ranking of the one or more second items based at least in part on an attribute ranking of the attribute rankings for each of the one or more second attributes and the blacklist;

selecting a set of the one or more second items based at least in part on the item ranking of the one or more second items and the blacklist, wherein the set of the one or more second items comprise a shared attribute of the one or more shared attributes and the blacklist does not comprise the shared attribute of the one or more shared attributes, the set of the one or more second items comprising a predetermined number of the one or more second items comprising one or more top rankings based on the item ranking of the one or more second items;

presenting for display in the comparison table, the set of the one or more second items and the first item; and presenting for display, proximate to the comparison table, a second set of the one or more second items, the second set of the one or more second items comprising a second predetermined number of the one or more second items comprising one or more next top rankings based on the item ranking of the one or more second items;

receiving a selection from the user of a selected item of the second set of the one or more second items; and updating the comparison table based at least in part on the selection from the user of the selected item of the second set of the one or more second items.

18. The method of claim 17, further comprising:
determining a whitelist comprising one or more approved attributes based on the attribute rankings of the set of attributes of the one or more products in the facet database, the set of attributes of the one or more products comprising the one or more approved attributes.

19. The method of claim 17, wherein:
receiving the selection from the user of the selected item of the second set of the one or more second items comprises the user selecting the selected item of the second set of the one or more second items and moving the selected item of the second set of the one or more second items into the comparison table.

20. The method of claim 17, wherein:
updating the comparison table based at least in part on the selection from the user of the selected item of the second set of the one or more second items comprises:
determining an updated item ranking of the one or more second items based at least in part on one or more attributes of the selected item of the second set of the one or more second items into the comparison table.

* * * * *